No. 742,977. PATENTED NOV. 3, 1903.
G. F. EVANS.
DEVICE FOR TRANSMITTING MOTION.
APPLICATION FILED FEB. 4, 1903.
NO MODEL.
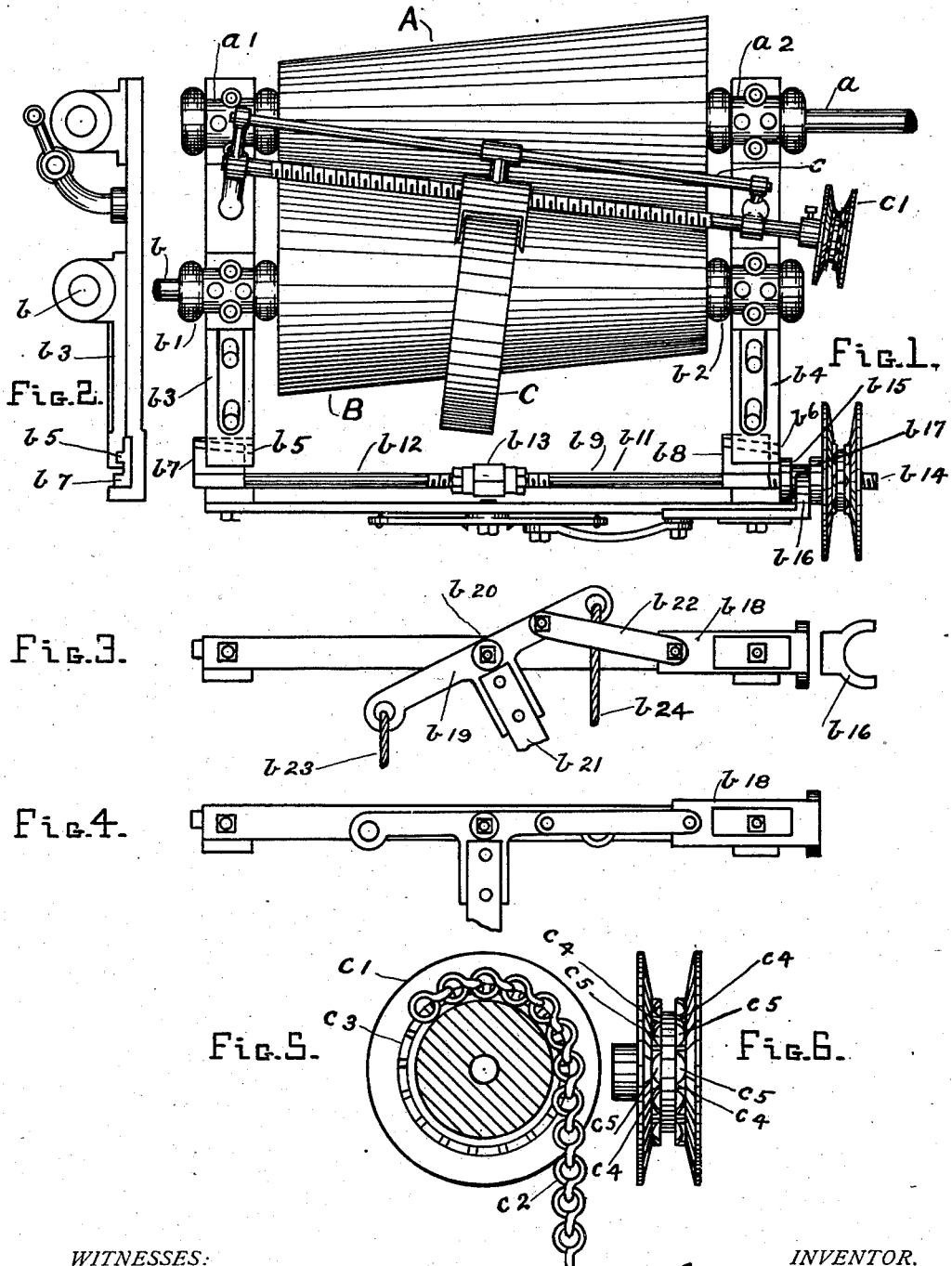

No. 742,977. Patented November 3, 1903.

UNITED STATES PATENT OFFICE.

GEORGE F. EVANS, OF NEWTON, MASSACHUSETTS.

DEVICE FOR TRANSMITTING MOTION.

SPECIFICATION forming part of Letters Patent No. 742,977, dated November 3, 1903.

Application filed February 4, 1903. Serial No. 141,943. (No model.)

*To all whom it may concern:*

Be it known that I, GEORGE F. EVANS, a citizen of the United States, residing at Newton, in the county of Middlesex and State of Massachusetts, have invented a new and useful Improvement in Devices for Transmitting Motion, of which the following is a full, clear, and exact description, reference being had to the accompanying drawings, forming a part of this specification, in explaining its nature.

My invention relates to the herein-described means in the construction and operation of cone-pulleys which transmit power from one to the other by aid of pressure and friction upon an endless belt passing between them.

The invention relates especially to means for adjusting the angle of one pulley with respect to the other, whereby a true parallel relation between them may be always obtained, and also to means for moving one pulley, preferably the adjustable one, bodily toward and from the other and in its adjusted relation thereto.

The invention further relates to means to protect the endless belt and its slide from injury during its movement.

I will now describe the invention in conjunction with the drawings forming a part of this specification, wherein—

Figure 1 is a view, principally in plan, of my improvement mounted upon a bed to show the invention. Fig. 2 is a detail view in end elevation to represent the relation between pulley-bearing slide and its operative cross-slide, hereinafter described. Figs. 3, 4, 5, and 6 are detail views, to which reference is hereinafter made.

Referring to the drawings, A, Fig. 1, represents what is usually called the "driving cone-pulley;" B, the driven cone-pulley; C, the endless belt which passes between them and transmits power from the pulley A to the pulley B. This belt has endwise movement imparted to it by means of a shipper $c$ in the usual way. In order, however, that it and its operating devices may not be injured by the use of unlimited or excessive force in making the movement, I have provided in lieu of the usual sprocket-wheel and chain on the end of the adjusting-screw $a$ a sprocket-wheel $c'$ and chain $c^2$. These are constructed as represented in Figs. 1, 5, and 6 and so that an undue strain or jerk upon the sprocket-wheel by the chain will cause the chain to ride upon the wheel instead of to turn it. This result is reached by providing the sprocket-wheel with a deep V-shaped groove $c^3$ slightly wider at its inner end than the width of the chain and by forming the sprockets $c^4$ in two lines to face each other and to be separated in each line by shallow curved recesses $c^5$, which are oppositely arranged. The two lines of sprockets and curved recesses are arranged to coöperate with the type of chain represented in Fig. 5, which consists of links each of which has two annular parts, one at a right angle to the other, so that the chain shall consist of annular rings which have this alternating angular relation to each other. The two lines of sprockets are separated from each other and the sprockets and recesses are so shaped that the alternating links of the chain enter the space between the two lines and bottom on the hub of the wheel and the alternate links enter the curved recesses $c^5$ between the sprockets $c^4$, but are held from entering them sufficiently far to make a positive engagement with the sprockets and are so held by the links which bottom on the hub. These form a connection between the sprocket-chain and the sprocket-wheel which is sufficiently positive to permit of the movement of the shipper $c$ and belt C when reasonable stress is applied to the chain, but which ceases to be positive when the resistance of the shipper or belt is increased beyond what is necessary to actuate them properly. This excess of resistance will then cause the chain to slip upon the sprocket-wheel instead of to turn it, the links of the chain then riding over the sprockets, and thus an excessive draft or pull or sudden jerk exerted upon the chain is prevented from injuring the shipper-belt or shipper-screw.

The cone-pulleys A and B are mounted upon shafts $a$ and $b$, respectively, extending from each end thereof and preferably integral with them. These shafts are supported in suitable boxes. The boxes $a'\ a^2$ of the cone-shaft $a$ are fixed to the bearing beams or supports. The boxes $b'\ b^2$ of the cone-shaft $b$ are mounted on slides $b^3$ $b^4$, carried by the bearing-beams or other supports and attached thereto in any desired way.

The slides are movable upon the bearing beams or supports lengthwise them and so as to move the cone-pulley B and its boxes toward and from the cone-pulley A. Each of these slides has extending across it from side to side diagonally and preferably from its under surface a recess or groove, which are lettered $b^5$ $b^6$, the walls of these recesses or grooves forming abutments against which a diagonal tongue on the slides $b^7$ $b^8$ respectively bear. These slides $b^7$ $b^8$ are connected with each other by the cross connection $b^9$. They are supported by the box-bearing beams or other supports carrying the box-slides $b^3$ $b^4$ and are capable of a lateral movement crosswise the beam or support or a movement at a right angle to the movement of the box-slides, and this movement causes the tongues to simultaneously move the box-slides, the boxes $b'$ $b^2$, mounted thereon, and the cone-pulley B upon the box-bearing beams or supports bodily either toward or from the cone-pulley, according to the direction in which the tongue-slides are moved. The cross connection $b^9$ is so constructed that the cross-slide $b^8$ may be adjusted with relation to the box-slide $b^4$ without adjusting the relation between the cross-slide $b^7$ and the box-slide $b^3$. This is accomplished by making the connection $b^9$ in two parts, one of which, the part $b^{11}$, is fixed to the end of the cross-slide $b^8$, and so as not to turn thereon, and the other of which, the part $b^{12}$, is similarly fixed to the cross-slide $b^7$. These parts $b^{11}$ $b^{12}$ of the connection $b^9$ are reversely threaded at their contiguous ends and are connected by the right and left adjusting and connecting nut $b^{13}$, which screws upon both said threaded ends. The turning of this nut enables the part $b^{11}$ to be moved endwise toward or from the part $b^{12}$, and consequently to adjust the position of the cross-slide $b^8$ with respect to the box-slide $b^4$. The part $b^{12}$ of the connection is held stationary during this adjustment, the purpose of which is to cause the cone-pulley B to be swung on the center of its box $b'$ toward or from the cone-pulley A, as may be desired, and so that it may be brought to a true parallel throughout its length with said cone-pulley and thereafter held in such position. To move the cone-pulley B when thus adjusted toward and from the cone-pulley A without modifying the adjustment and so that the parts of the cone-pulley B are uniformly moved, both cross-slides $b^7$ $b^8$ are simultaneously moved crosswise of the bearing beams or supports and the box-slides $b^3$ $b^4$ and with the same extent of movement. This preferably is accomplished by means of a stationary nut and a screw connected with one of the cross-slides and adapted by the turning of the nut to move the cross-slides crosswise the bearing-beam or support in one direction or the other, according as the nut is turned.

$b^{14}$ represents a screw extending from the side of the cross-slide $b^8$.

$b^{15}$ is the stationary nut, the turning of which causes the cross-slides to be provided with the movements specified. The nut $b^{15}$ is held from endwise movement while it is being turned by means of a yoke $b^{16}$, the arms of which enter an annular recess $b^{17}$ in the nut. This yoke may be stationarily held at all times; but I prefer to so mount it that it may be moved at times and then operated to move the nut, the adjusting connection, and the inclined slide-blocks quickly and together, so as to effect an immediate release of the cone-pulley or an immediate closing of it without turning the nut and after it has been turned to produce the requisite pressure upon the band. This permits the screw to be used in obtaining a preliminary movement of the cone-pulley and application of pressure by it to the band and then permits the further opening and closing movements of the pulley to be had without changing the working pressure of the pulley. When the yoke $b^{16}$ is so actuated, I prefer to mount it upon a slide $b^{18}$, from which it extends at a right angle, and which slide is attached to any part of the frame in any desired way to have endwise movement imparted to it, and as one means of giving it this movement and of holding it in place I have represented a rock-lever $b^{19}$, pivoted at $b^{20}$, having an operating-arm $b^{21}$, by which it may be turned, and also having a connection with the slide by means of the link $b^{22}$. The movement of the lever in one direction will move the slide outward and in the reverse direction inward, and will thereby cause corresponding movements to be communicated to the nut and the cross-slides. The centers of the lever and link are such that when in line with each other the slide is locked from further movement, and this occurs when the slides have been moved to force the cone-pulley into operative engagement with the belt. I have shown the lever $b^{19}$ as extended sufficiently to furnish arms for holding the pull cords or ropes $b^{23}$ and $b^{24}$, and these may be used without the handle $b^{21}$ or with it, as may be preferred.

Having thus fully described my invention, I claim and desire to secure by Letters Patent of the United States—

1. In a device for transmitting motion of the character specified, the combination of a fixed cone-pulley, a movable cone-pulley, an endless band or belt arranged between them, journal-boxes for the movable pulley, slides upon which the boxes of the movable cone-pulley are mounted, provided with bearing-faces extending diagonally across them, and means to engage said bearing-faces to move the box-slides and pulley back and forth comprising cross-slides having inclined faces to bear against the inclined bearings of the box-slides and movable laterally in relation to them.

2. In a device for transmitting motion of the character specified, the combination of a fixed cone-pulley, a movable cone-pulley, an endless band or belt arranged between them, journal-boxes for the movable pulley, slides upon which the boxes of the movable cone-pulley are mounted provided with bearing-faces extending diagonally across them, means to engage said bearing-faces to move the box-slides and pulley back and forth comprising cross-slides having inclined faces to bear against the inclined bearings of the slides, a screw, a fixed nut mounted upon the screw, and means for turning the nut.

3. In a device for transmitting motion of the character specified, in combination with the movable cone-pulley thereof, journal-boxes for the movable pulley, slides upon which its boxes are mounted provided with bearing-faces extending diagonally across it, means to engage said bearing-faces to move and hold the pulley-slides and pulley comprising cross-slides having inclined faces to bear against the inclined bearings of the slides and movable laterally in relation to them, and an adjusting device for moving one of said slides with relation to the other.

4. In a device for transmitting motion of the character specified, in combination with the movable cone-pulley thereof, the fixed pulley, means for adjusting the axis of said pulley to the axis of the fixed pulley, and further means for moving the movable pulley in its adjusted position.

5. In a device for transmitting motion of the character specified, in combination with the movable cone-pulley thereof, journal-boxes for the movable pulley, slides upon which the boxes of said pulley are mounted, means for moving one slide with respect to the other, and further means for moving said slides in unison and at the same rate of movement.

6. In a device for transmitting motion of the character specified, in combination with the movable cone-pulley thereof, slides upon which said cone-pulley is mounted, means for imparting to one of the slides a movement independent of the other, further means for moving the slides simultaneously to any degree desired and for then holding them, and additional devices for quickly releasing and restoring said moving and holding means.

7. In a device for transmitting motion of the character specified, in combination with the movable cone-pulley thereof, journal-boxes for the movable pulley, slides upon which its boxes are mounted, means for moving said slides simultaneously, a screw and nut for actuating said means, and devices for moving the nut laterally to effect a movement of the slides without turning the nut.

8. In a device for transmitting motion of the character specified, in combination with the movable cone-pulley thereof and its endless band or belt, journal-boxes for the movable pulley, slides upon which the boxes of the movable cone-pulley are mounted, means for imparting to said slides a simultaneous movement, and an actuating device for operating said means the power of which is limited to prevent injury to the band or belt.

9. In a device for transmitting motion of the character specified, in combination with the movable cone-pulley thereof and its endless band or belt, journal-boxes for the movable pulley, slides upon which the boxes of the movable cone-pulley are mounted, means laterally movable with respect to the slides to operate them, devices for providing said means with lateral movement comprising a screw and nut, and means for moving the slide-actuating devices and the nut laterally together and for locking them with the movable cone-pulley in operative position.

10. A motion-transmitting mechanism, comprising a sprocket-wheel having rounded pockets for engaging by their outer faces the links of the sprocket-chain, and a sprocket-chain having links a portion of each of which is of a size to be embraced by said pockets and a portion of which bottom on the wheel whereby the engagement between the pockets and the links is of a character to cause the links to become disengaged from the pockets upon an excess of strain upon the chain.

GEORGE F. EVANS.

Witnesses:
F. F. RAYMOND, 2d,
J. M. DOLAN.